US012395585B2

(12) United States Patent
Frommelt et al.

(10) Patent No.: US 12,395,585 B2
(45) Date of Patent: Aug. 19, 2025

(54) DISAMBIGUATION OF MULTIPLE CALLERS USING A SHARED COMMUNICATION SOURCE

(71) Applicant: MOTOROLA SOLUTIONS, INC., Chicago, IL (US)

(72) Inventors: Brian J. Frommelt, Naperville, IL (US); Amruthavarshini Hiriyur Krishnamurthy, Karnataka (IN); Divya Ramamoorthy, Cooper City, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 436 days.

(21) Appl. No.: 18/056,049

(22) Filed: Nov. 16, 2022

(65) Prior Publication Data

US 2024/0163367 A1    May 16, 2024

(51) Int. Cl.
*H04M 3/42*         (2006.01)
(52) U.S. Cl.
CPC ... *H04M 3/42042* (2013.01); *H04M 3/42068* (2013.01)
(58) Field of Classification Search
CPC ............... H04M 3/42068; H04M 3/42042
USPC ........................................................ 455/415
See application file for complete search history.

(56) References Cited

U.S. PATENT DOCUMENTS

| 8,606,576 | B1  | 12/2013 | Barr et al. |
| 8,917,853 | B2  | 12/2014 | Dheap et al. |
| 9,113,001 | B2  | 8/2015  | Rajakumar et al. |
| 2010/0119046 | A1 | 5/2010 | Hoblit et al. |
| 2012/0263285 | A1* | 10/2012 | Rajakumar ............ G10L 17/00 379/189 |
| 2016/0309030 | A1 | 10/2016 | Tietsch |
| 2020/0258606 | A1* | 8/2020 | Ferentz ................ G06F 16/245 |

\* cited by examiner

*Primary Examiner* — Ahmad F. Matar
*Assistant Examiner* — Jirapon Tulop
(74) *Attorney, Agent, or Firm* — Michael Best & Friedrich LLP

(57) ABSTRACT

Systems and methods for automated caller profile generation and identification. One example method includes receiving, from a service answering point, a service call from a caller. The method includes determining, with an electronic processor, based on a content of the service call, a call characteristic. The method includes generate a preliminary caller profile based on the call characteristic. The method includes comparing the preliminary caller profile to each of a plurality of existing caller profiles retrieved from a database storing caller profile data for a plurality of callers to generate, for each of the plurality of existing caller profiles, an association score based on the comparison. The method includes presenting data about the caller from the existing caller profile on a call-taking terminal of the service answering point assigned to the service call when the association score for one of the plurality of existing caller profiles exceeds an association threshold.

20 Claims, 5 Drawing Sheets

| Indicators | Date | Time | CPN | Location | | Circuit | ESN |
|---|---|---|---|---|---|---|---|
| ★ | 6/22/2021 | 11:30:28 AM | 5557782122 | Query Caller Nashville | 85% | COVID-19 Queue | 107 |
| ☆ | 6/22/2021 | 11:06:11 AM | 5555556666 | | | COVID-19 SMS Queue | |
| ☆ | 6/22/2021 | 10:17:43 AM | 5557782123 | Query Caller Nashville | | 911-3 | 107 |
| ☆ | 6/22/2021 | 9:12:52 AM | 5555559999 | 123 Main Street Anytown | | 911-9 | 123 |

FIG. 4

DISAMBIGUATION OF MULTIPLE CALLERS USING A SHARED COMMUNICATION SOURCE

BACKGROUND OF THE INVENTION

Members of the public may need mental health and substance abuse crisis intervention that cannot be addressed by or does not require the services of traditional public safety responses (i.e., emergency medical services, law enforcement, and fire and rescue services). Crisis call centers have been established to provide such services, to improve suicide prevention efforts, and to address other public needs for social services. Members of the public may seek assistance by dialing 988 in the United States, and other similar type hotlines elsewhere. Crisis call centers provide confidential telephonic crisis intervention are typically separate from 911 emergency call centers (sometimes designated in other countries as 112, 999, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

FIG. 4 illustrates an example graphical user interface generated for a call-taking terminal when the method of FIG. 3 is performed using the system of FIG. 1 in accordance with some examples.

Figure 1:
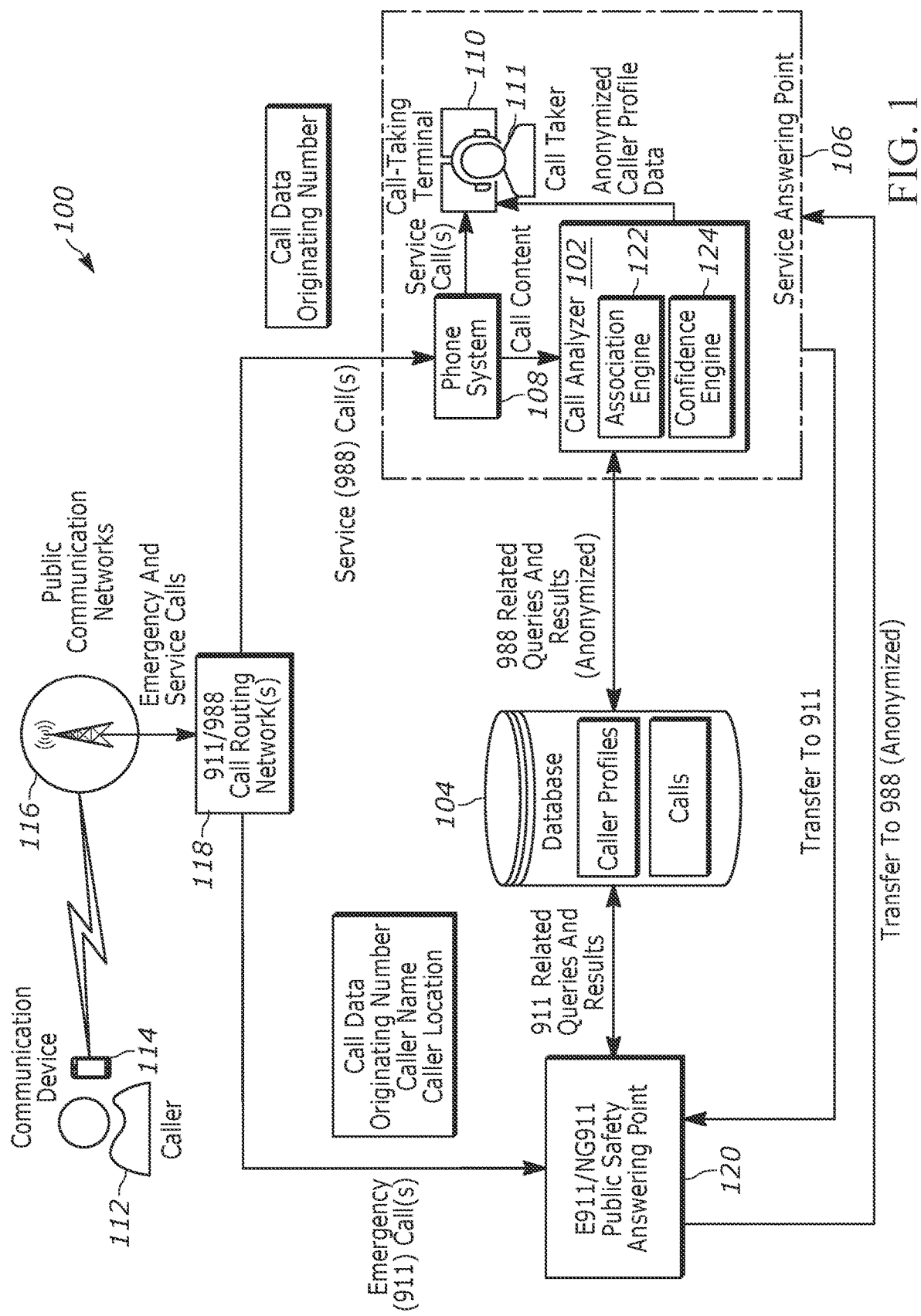
FIG. 1 illustrates a public safety communications system in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

Members of the public requesting assistance related to a public safety incident may make emergency calls for help using the 911 system. Emergency calls are terminated at a public safety answering point (PSAP) where call takers answer and process the calls. Current 911 systems, including Enhanced 911 (E911) systems and Next Generation 911 (NG911) systems, automatically determine the identity and location of an emergency caller and present the information to a call taker, who may gather information from the caller about the incident, and dispatch appropriate services to respond to the incident.

It has been recognized that some callers to 911, although still in need of assistance, do not require a traditional public safety response from police, fire, or emergency medical services. For example, some callers are experiencing non-life-threatening mental health episodes, struggling with an addiction, or otherwise in need of social services. Furthermore, some people in need of such assistance may not call 911, but also may not know how to seek assistance.

To address these needs, crisis call centers are established to provide telephonic crisis intervention and other non-emergency assistance. Crisis call centers can be reached by calling 988, similar to how 911 operates. However, to encourage people in need of such services to ask for help, and in compliance with applicable laws and regulations, crisis call centers provide their assistance without requiring personal information (name, location, and the like) from callers. As a consequence, 988 systems, although they may share some similarities with 911 systems, are typically maintained and staffed separately from 911 systems.

Some callers may contact 988 repeatedly for help with the same or similar problems. Identifying that a current caller is also a past caller can help a call taker to assist the caller more quickly and effectively. Caller identification can be accomplished without breaking confidentiality. For example, each caller may be assigned a unique alphanumeric identifier for use within the 988 system. In 911 systems, a caller's phone number may be used to determine who is calling. However, information beyond the caller's phone number is not provided to 988 call takers. Furthermore, a single phone number may be shared across multiple users and/or devices. For example, workplace colleagues may share a common business telephone number when making outbound calls, people living in the same household may share a landline, and some people may share use of a common mobile telephone. In some instances, such as community based residential treatment or correctional facilities, residents may only have access to a shared telephone. Regardless of the reason, a telephone number alone cannot provide assurance to a call taker that they are dealing with the same caller each time a call originates from that telephone number.

To address, among other things, these technical problems with existing communication means, including the technical problem of identifying repeat callers without identifying them individually (for example, by name or in another personally identifiable manner), systems and methods are provided herein for automated caller profile generation and anonymous identification for crisis call centers. Embodiments and aspects described herein provide, among other things, a caller profile database and a call analyzer. The caller profile database stores caller profiles for past callers to the 988 system. Caller profiles include anonymized information about a unique caller. The call analyzer may reside at a crisis call center or its functionality may be distributed. The call analyzer receives call content for calls to the 988 system and determines call characteristics, which it uses to identify a profile for a caller to a crisis center. The call handler determines, using, among other things, audio analytics, voice recognition, text analytics, phone number, and phone number history, whether a current caller matches a caller profile stored in the caller profile database.

Caller data from the caller profile may be presented to call taker to help the call taker better help the caller. For example, a caller may have a history of a particular mental illness that is best handled in a certain way, such as by avoiding or focusing on certain topics of conversation. As call takers work with callers, the caller profile may be revised to make a future call response more effective. Where there is no existing caller profile, a new caller profile may be created for the caller.

In some instances, multiple existing profiles may match a current caller. Accordingly, in some aspects, the call analyzer will determine a confidence score for the matches, to improve the likelihood that the caller is correctly identified.

In some aspects, the caller profile database is shared between the 911 and 988 systems and configured to provide full profile data to the 911 system while providing anonymized profile data to the 988 system.

Embodiments and aspects described herein, by automatically generating and identifying caller profiles for crisis call centers, improves the overall operation of the crisis call centers. This improvement, in turn, leads to more efficient use of computer aided dispatch systems and more efficient use of 988 and 911 communications networks and their respective computing resources, among other benefits. It also helps solve the technical problem of identifying a caller uniquely without identifying a caller personally.

One example provides a system for automated caller profile generation and identification. The system includes a database storing caller profile data for a plurality of callers and an electronic processor communicatively coupled to the database. The electronic processor is configured to receive, from a service answering point, a service call from a caller. The electronic processor is configured to determine, based on a content of the service call, a call characteristic. The electronic processor is configured to generate a preliminary caller profile based on the call characteristic. The electronic processor is configured to compare the preliminary caller profile to each of a plurality of existing caller profiles retrieved from the database to generate, for each of the plurality of existing caller profiles, an association score based on the comparison. The electronic processor is configured to, when the association score for one of the plurality of existing caller profiles exceeds an association threshold, present data about the caller from the existing caller profile on a call-taking terminal of the service answering point assigned to the service call. The electronic processor is configured to, when none of the association scores for the plurality of existing caller profiles exceeds the association threshold, save the preliminary caller profile to the database as a new caller profile.

Another example provides a method for automated caller profile generation and identification. The method includes receiving, from a service answering point, a service call from a caller. The method includes determining, with an electronic processor, based on a content of the service call, a call characteristic. The method includes generate a preliminary caller profile based on the call characteristic. The method includes comparing the preliminary caller profile to each of a plurality of existing caller profiles retrieved from a database storing caller profile data for a plurality of callers to generate, for each of the plurality of existing caller profiles, an association score based on the comparison. The method includes presenting data about the caller from the existing caller profile on a call-taking terminal of the service answering point assigned to the service call when the association score for one of the plurality of existing caller profiles exceeds an association threshold.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 illustrates an example public safety communications system 100. In the example shown, the system 100 includes a call analyzer device 102 and a database 104. It should be understood that the system 100 is provided as one example and, in some instances, the system 100 may include fewer or additional components. As would be understood by one skilled in the art, FIG. 1 is a simplified diagram. Networks are more complex than the schematic elements depicted in FIG. 1.

The call analyzer device 102, the database 104, and the other illustrated components of FIG. 1 are communicatively coupled to one another via one or more communications networks including wireless connections, wired connections, or combinations of both. A suitable communications network may be implemented using various local and wide area networks, for example, a Bluetooth™ network, a Wi-Fi™ network, the Internet, a land mobile radio network, a cellular data network (for example, a Long Term Evolution (LTE) network, a 5G network, and the like) or combinations or derivatives thereof.

Figure 2:
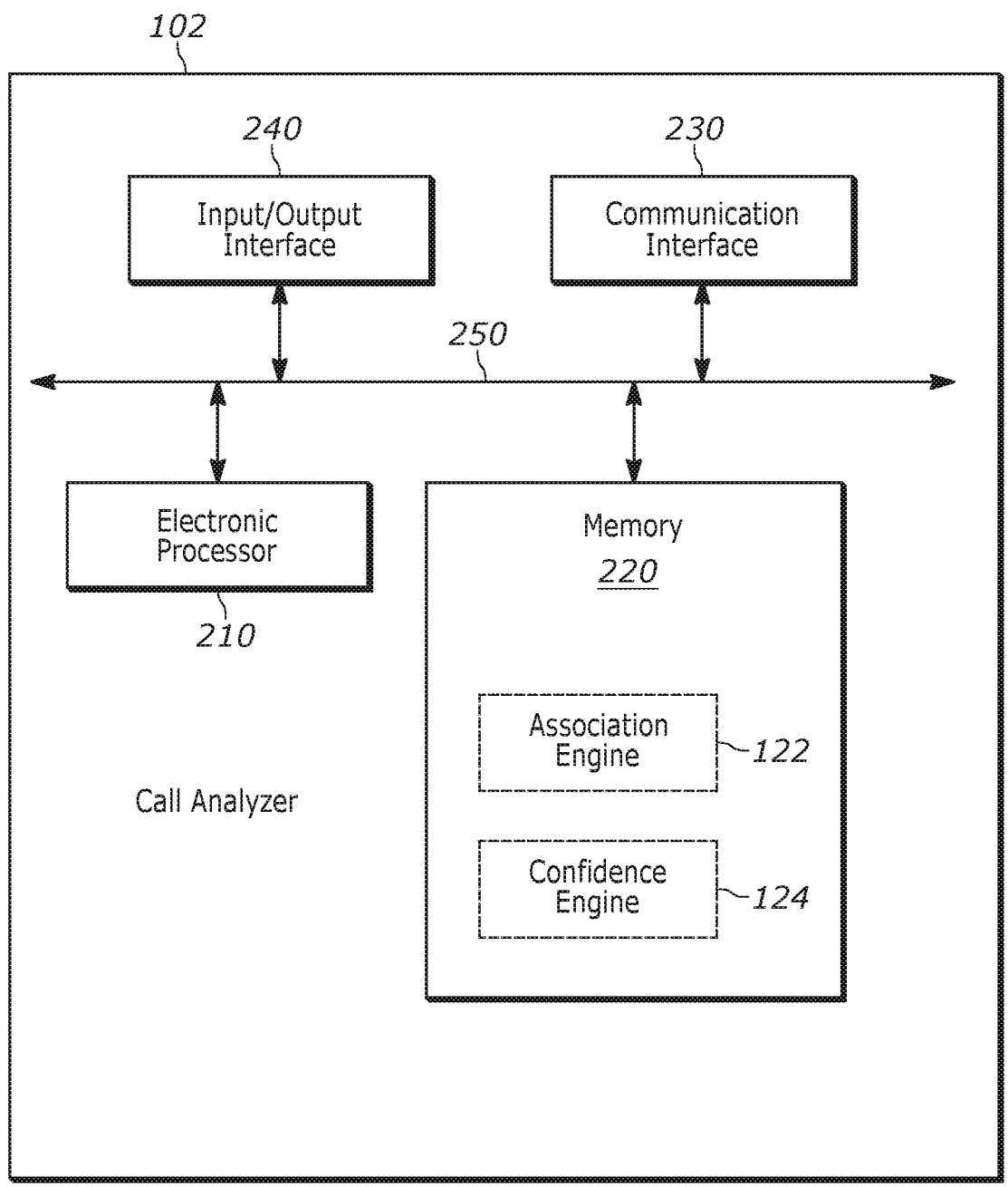
FIG. 2 schematically illustrates a call handler of the system of FIG. 1 in accordance with some examples.

The call analyzer device 102, as illustrated in FIG. 1 and described more particularly with respect to FIG. 2, is a computer or computing device residing at a service answering point 106. In some aspects, the call analyzer device 102 is distributed among multiple computing devices at the service answering point 106. In some aspects, some or all of the call analyzer device 102 is implemented by a cloud computing environment. In some instances, components of the call analyzer device 102 may be distributed among multiple locations and communicatively coupled to one another via one or more communications networks.

As herein, the term "service answering point" refers to a crisis call center. Service answering points are similar to public safety answering points (PSAPs), except that they handle calls made to 988 (and similar numbers internationally) and not to 911 (and similar numbers internationally). The service answering point 106 performs operations similar to computer aided dispatch (CAD) operations to provide telephonic crisis intervention and other social services to callers. The service answering point 106 is one example of a service answering point and includes a phone system 108 and a call-taking terminal 110. The call-taking terminal 110 includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and headsets.

The components of the service answering point 106 are communicatively coupled using one or more wired and/or wireless networks (not shown). A call taker 111 interacts with the call-taking terminal 110 to answer communications, including service calls made to 988, received at the service answering point 106, and to access and modify data stored in the database 104. For example, a caller 112, using a communication device 114 (for example, a telephone, a smart telephone, a tablet computer, or another similar device capable of operating as described herein) places a call to 988 using the public communication network 116 (for example, a cellular network, the public switched telephone network, the Internet, or another suitable network). The call is routed to the 911/988 call routing system 118, which includes hardware and software for automatically routing 911 calls to the 911 public safety answering point 120 and 988 calls to the service answering point 106.

As illustrated in FIG. 1, the phone system 108 receives and routes 988 calls, and, as described herein, provides call content data to the call analyzer device 102. As described herein, the call analyzer device 102 is configured to analyze the call content (using the association engine 122 and the confidence engine 124) to, among other things, locate profile data for the call in the database 104.

As illustrated in FIG. 1, the database 104 may be a database housed on a suitable database server communicatively coupled to and accessible by the call analyzer device 102. In some examples, the database 104 may be part of a cloud-based database system (for example, a data warehouse) external to the system 100 and accessible by components of the system 100 over one or more wired or wireless networks. In other configurations, all or part of the database 104 may be locally stored at the service answering point 106. In some aspects, the database 104 is a caller profile database that electronically stores caller profile data and call data.

Caller profile data refers to profiles stored for individuals who have called 988. Caller profiles contain information unique to and associated with individual callers. For example, each caller profile includes (or is named, titled, or identified via) a unique caller identifier for the caller. The unique caller identifier is not related to or derived from any personal identifiable information for the caller. Caller profiles may also include information relating to the caller's needs (for example, any illnesses, medications, concerns, or other issues reported by the caller in the past). Caller profiles may also include information related to previous calls from the caller (for example, the time and date of the call, the issue or problem that prompted the call, a resolution for the call, and the like). Caller profiles include information used to associate a current caller with an existing caller profile. For example, audio analytics for the caller's voice and manner of speaking, such as tone, pitch, cadence, accent, dialect, a voice print, and the like. Another example includes audio analytics for ambient sound from past calls, such as the level of background noise, echo, identifiable sounds, and the like. Another example includes text analytics of the caller's spoken or written words, such as sentence structure, vocabulary, phrasing, and the like. Because caller profile data may, in some embodiments, also be accessible by the public safety answering point 120, caller profile data may include personal identifiable information for callers (for example, name, email addresses, physical address, GPS location, and the like). However, the database 104 is configured to withhold or remove any personal identifiable information from profiles sent to the service answering point 106, either before or it stored at the service answering point 106 or before it is presented to the call taker, among other possibilities. In other embodiments, personally identifiable information may be actively prevented from being stored into the caller profile and/or periodically scrubbed to remove any personally identifiable information (such as addresses, personal names, towns, etc.) by accessing one or more databases of public information and removing any matches found between information entered into the caller profile by the call taker and the public information. Other examples are possible as well.

In some aspects, the database 104, responsive to receiving a request from the service answering point 106 to provide the plurality of existing caller profiles, provides the plurality of existing caller profiles, including their respective unique caller identifiers and not including any personal identifiable information for the callers associated with the plurality of existing caller profiles.

In some aspects, the database 104, responsive to receiving a request from the public safety answering point 120 to provide an existing caller profile, provides the existing caller profile, including any personal identifiable information for the caller existing caller profile.

Call data includes data for calls, including service calls routed to the service answering point 106 and emergency calls routed to the PSAP 120. Examples of call data include a call identifier (for example, a unique alphanumeric code that identifies the call record within a computer-aided dispatch system), the time and date of the call, a location from which the call was placed, the caller profile identifier identifying the caller that placed the call, and the like. As described herein, the call analyzer device 102 is able to retrieve anonymized call data to determine whether a number has called either 911 or 988 in the past.

As referred to herein, the term "service call" refers to a call made by a caller to 988 and is distinguished from an "emergency call" made by a caller to 911. Further, it should be understood that the terms "service call" and "emergency call" encompass both voice and text communications. For example, a caller may place a service call by dialing 988 on a telephone and speaking with a call taker. In another example, a caller may place service calls by sending text messages (for example, a short message service (SMS) message and multimedia message service (MMS) messages), email messages, pages, instant messages, and the like. Such text-based requests are also processed by call takers.

As illustrated in FIG. 1, the service answering point 106 may be configured to exchange calls with the PSAP 120 and vice versa. For example, a caller may contact 911 for assistance with something better handled by a crisis call center. In such instances, the caller may be transferred to the service answering point 106. However, as illustrated in FIG. 1 and noted here, calls to 988 provide the originating number only, while calls to 911 provide the originating number and (if available) the caller's name and caller location. When a caller is transferred from the PSAP 120 to the service answering point 106, the call data is anonymized, removing any personal identifiable information, including the caller's name and location. In some instances, a caller may contact 988, but actually be in need of emergency services (for example, a caller may be in need of emergency medical attention). In such instances, the caller may be transferred to the PSAP 120. As explained, the call will lack any personal identifiable information, including the caller's name and location. Upon receipt of such a call, the PSAP 120 is configured to acquire the caller's name and location using the phone number or by other means.

FIG. 2 schematically illustrates one example of the call analyzer device 102. In the example illustrated, the call analyzer device 102 includes an electronic processor 210, a memory 220, a communication interface 230, and an input/output interface 240. The electronic processor 210, the memory 220, the communication interface 230, and the input/output interface 240 communicate over one or more control and/or data buses (for example, a communication bus 250). In some embodiments, the call analyzer device 102 is a computer server. FIG. 2 illustrates only one example embodiment of a call analyzer device 102. The call analyzer device 102 may include fewer or additional components and may perform functions other than those explicitly described herein.

In some embodiments, the electronic processor 210 is implemented as a microprocessor with separate memory, for example, the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the call analyzer device 102 described herein. The memory 220 may include, for example, a program storage area and a data storage area. The program storage area and the data storage area may include combinations of different types of memory, for example, read-only memory and random-access memory. In the embodiment illustrated, the memory 220 stores, among other things, the association engine 122 and the confidence engine 124, both explained in detail herein.

The communication interface 230 sends and receives communications to and from the call analyzer device 102 and other components of the system 100.

The input/output interface 240 may include one or more input mechanisms (for example, a touch screen, a keypad, buttons, knobs, and the like), one or more output mechanisms (for example, a display, a printer, a speaker, and the like), or a combination thereof. The input/output interface 240 receives input from input devices actuated by a user and provides output to output devices with which the user interacts. In some instances, as an alternative or in addition to managing inputs and outputs through the input/output interface 240, the call analyzer device 102 may receive user input, provide user output, or both by communicating with an external device, for example, a console computer (for example, the call-taking terminal 110), over a wired or wireless connection.

In some examples, the call analyzer device 102 uses one or more machine learning methods to analyze call content (as described herein).

Figure 3:
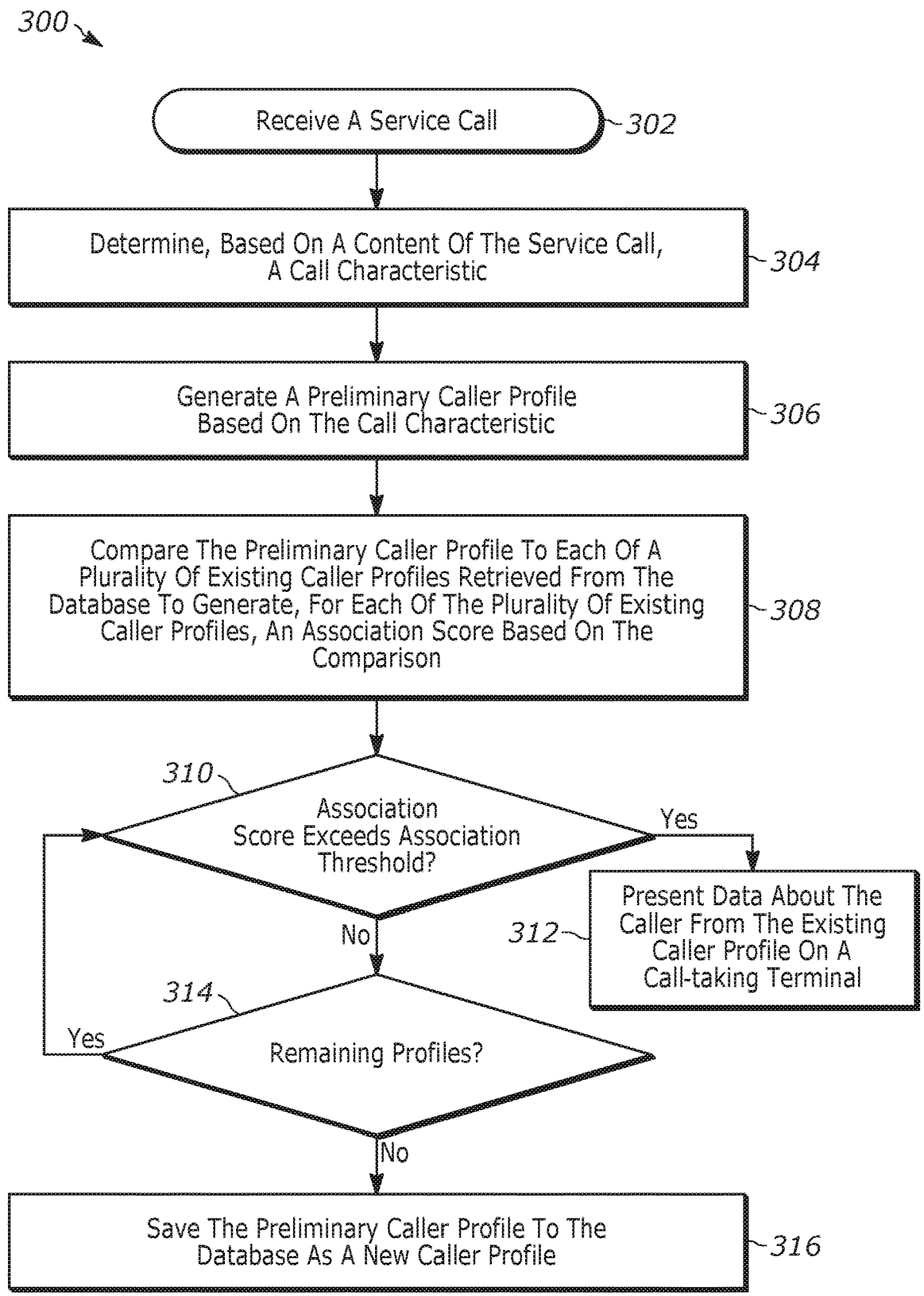
FIG. 3 is a flowchart illustrating a method for automated caller profile generation and identification in accordance with some examples.

As noted, the inability to distinguish callers to a service answering point from a single shared communication device may lead to delayed or inaccurate caller response, and overuse of network and computing resources. To mitigate these problems, the call analyzer device 102 automatically determines a caller profile based on a current callers call content. In one example embodiment, the call analyzer device 102 includes in the memory 220 an association engine 122 and a confidence engine 124, which are used to perform an example method 300 for automated caller profile generation and identification (illustrated in FIG. 3). Although the method 300 is described in conjunction with the system 100 as described herein, the method 300 may be used with other systems and devices. For example, the method 300 may be used to identify 911 callers where other identification information has not been provided with the call or is otherwise unavailable. In addition, the method 300 may be modified or performed differently than the specific example provided.

As an example, the method 300 is described as being performed by the call analyzer device 102 and, in particular, the electronic processor 210. In some examples, the electronic processor 210 includes multiple electronic processors included in the call analyzer device 102 that perform all or a portion of the method 300. Further, in some aspects, the call analyzer device 102 is a distributed controller in which processors of multiple devices cooperate to form the call analyzer device 102 and perform its functionality. In some aspects, portions of the method 300 may be performed by other devices, including for example, the call-taking terminal 128. It should be understood that, while the method 300 is described in terms of a single emergency call, the method 300 is applicable to process multiple service calls or emergency calls, as applicable.

At block 302, the electronic processor 210 receives a service call. For example, the phone system 108 may receive a service call routed from the 911/988 call routing system 118 and copy call content for the call to the communication interface 230. Call content may include an audio stream of a phone call, voice samples taken from the audio stream, text from the call (for example, from a text message call or text transcribed from the audio stream of the call), or combinations of the foregoing.

At block 304, the electronic processor 210 determines, based on a content of the service call, one or more call characteristics. A call characteristic is a feature of the call that may be used to identify select an existing caller profile for the caller. Some call characteristics are descriptive facts about the service call, such as, for example, the originating number of the service call. Other call characteristics are derived from the content of the service call.

For example, the content of the service call may include an audio stream of the telephone call and the electronic processor 210 determines a call characteristic by performing audio analytics on the audio stream. For example, audio analytics may determine factors about the caller's voice, including tone, pitch, cadence, accent, and dialect. In another example, audio analytics include analysis of ambient or background sound of the call (for example, to identify the environment of the caller). In another example, the content of the service call includes a voice sample (for example, a segment of the audio stream featuring the voice of the caller) and the electronic processor 210 determines a call characteristic by performing voice recognition on the voice sample to produce a voice recognition or voice print analysis.

In another example, the content of the service call includes text (for example, from a text message or an automated transcription of the audio stream) and the electronic processor 210 determines a call characteristic by performing text analytics on the text. For example, the text analytics may determine factors about what the caller is saying and how it is said (for example, sentence structure, vocabulary, phrasing, and the like).

At block 306, the electronic processor 210 generates a preliminary caller profile based on the call characteristics. For example, the call characteristics may be combined into a record along with other data, such as the originating call number, the time and date, and relevant metadata.

At block 308, the electronic processor 210 compares the preliminary caller profile to each of a plurality of existing caller profiles retrieved from the database to generate (for example, using the association engine 122), for each of the plurality of existing caller profiles, an association score based on the comparison. An association score is a numerical representation (for example, a percentage) of how closely the preliminary caller profile matches an existing caller profile.

In one example, the association engines 122 utilizes the following algorithm: Association Score=$((A+T+P+I)/4)$, where A is the audio analytics factor, T is the text analytics factor, P is the originating number factor, and I is the issue factor.

In one example, the audio analytics factor is a percentage value determined by the equation $(t+p+c+a+d+v)/n$, where t is tone, p is pitch, c is cadence, a is accent, d is dialect, and v is voice recognition. Each of t, p, c, a, d, and v are expressed as a percentage and n is the number of those inputs above zero (that is, A may be determined with some or all of t, p, c, a, d, and v).

In one example, the text analytics factor is a percentage value determined by the equation $(s+b+h)/n$, where s is sentence structure, b is vocabulary, and h is phrasing. Each of s, b, and h are expressed as a percentage and n is the number of those inputs above zero (that is, T may be determined with some or all of s, b, and h).

The originating number factor is expressed as 0 or 1, where 0 indicates that the originating number is a not a match and 1 indicates that the originating number is a match.

The issue factor is expressed as 0, 0.5, or 1, where 0 indicates that the issue is a not a match, 0.5 indicates that the issue is similar, and 1 indicates that the issue is a match. Issue refers to the issue or problem the caller is calling about, as determined, for example, using audio and/or text analytics. In some aspects, the issue is determined from inputs made by the call taker as the service call progresses.

In some examples, the call analyzer device 102 only retrieves profiles for analysis when it determines that it is likely that the caller has previously called the service answering point or a public safety answering point. For example, the electronic processor 210 may determine an originating number for the service call. An originating number may be a telephone number in the case of a telephone call or an IP address in the case of a text message or other computer-initiated service call.

The electronic processor 210 determines that it is likely that the caller has previously called the service answering point or a public safety answering point when the originating number matches a prior originating number known to the service answering point or a public safety answering point. For example, the electronic processor 210 may query the caller profile database 104 using the originating number.

The electronic processor 210, responsive to determining that it is likely that the caller has previously called the service answering point or the public safety answering point, retrieves, from the database, the plurality of existing caller profiles based on the originating number.

After making retrieving the plurality of existing caller profiles and generating the association scores, the electronic processor 210 compares the association scores to an association threshold. The association threshold represents a minimum matching percentage between preliminary caller profile and an existing caller profile. In one example, the association threshold is 50%.

At block 310, when the association score for one of the plurality of existing caller profiles exceeds the association threshold, the electronic processor 210 presents (at block 312) data about the caller from the existing caller profile on a call-taking terminal of the service answering point assigned to the service call.

For example, the call analyzer device 102, the call-taking terminal 110, or another computing device (not illustrated) may generate, on the call-taking terminal, a graphical user interface including a call indicator associated with the service call. FIG. 4 illustrated an example graphical user interface 400, including a call indicator 402. The call indicator 402 includes a call identifier 404, a profile match indicator 406, and a confidence score indicator 408. The call identifier 404 identifies the call. The profile match indicator indicates that at least one existing caller profile matches the call's preliminary caller profile. The confidence score indicator represents the confidence score for the matching profile (as described herein). The level of match may be represented using a numerical percentage, a color, an icon, an animation, or another suitable means.

In some aspects the profile match indicator and the confidence score indicator are selectable controls. For example, the electronic processor 210 may receive a user input selecting either the profile match indicator or the confidence score indicator and present the data about the caller from the existing caller profile responsive to receiving the user input.

In some instances, multiple existing profiles may exceed the association threshold. In some embodiments, data about the caller from each of the matching existing caller profiles is displayed on a call-taking terminal (for example, with indications that there are multiple matching profiles and options for the call taker to select one or more profiles to view the underlying data).

Returning to FIG. 3, in other instances, confidence scores are used to determine which of the matching profiles to select for display. A confidence score is a numerical representation (for example, a percentage) of how likely it is that the matched existing profile is the correct profile. In one example, for each of the plurality of existing caller profiles where the association score exceeds the association threshold, the electronic processor 210 generates a confidence score for the existing caller profile based on the call characteristics and confidence factors (weighting factors) associated with the call characteristics.

In one example, the confidence score is determined using the following algorithm: Confidence Score=$((A*Aw)+(T*Tw)+(P*Pw)+(I*Iw))$, where Aw is the audio analytics weighting factor, Tw is the text analytics weighting factor, Pw is the originating number weighting factor, and Iw is the issue weighting factor. The weighting factors are used to indicate how significant particular call characteristics are to identifying a caller profile, relative to the other call characteristics. Call characteristics with a higher weight contribute more to the confidence score.

Weighting factors may be set by the policies of the agency operating the crisis call center. In some aspects, weighting factors may be adjusted using feedback from call takers and machine learning algorithms. One example, weighting factor scheme is Aw=30%, Tw=20%, Pw=40%, and Iw=10%. In this example, the originating number factor is given the highest weight because it is absolute, while other characteristics may be subjective. For example, the originating number either matches or not, while the issue of the call might be more difficult to match because they rely on caller descriptions. Similarly, audio and text analytics include many variables, so they are weighted higher than issue, but lower that originating number.

In some aspects, weighting factors may be made up of sub-factors. For example, each type of audio analytic may be assigned a weighting sub-factor and the Aw weighting factor is derived using the sub-factors.

In some instances, the electronic processor 210 presents data about the caller from the existing caller profile on the call-taking terminal only when the confidence score for the existing caller profile exceeds a confidence threshold. The confidence threshold represents a minimum confidence score. In one example, the confidence threshold is 50%. In some aspects, the electronic processor 210 presents data about the caller from the existing caller profile with the highest confidence score.

In some aspects, the call analyzer device 102 extracts the data about the caller from the existing caller profile based on the confidence score for the existing caller profile. For example, less information may be shared with the call taker where a confidence score is 50% than where the confidence score is 80%.

At block 310, when the association score for one of the plurality of existing caller profiles does not exceed the association threshold, the electronic processor 210 continues checking profiles until none remain to be checked (at blocks 312-314).

In some aspects, when none of the association scores for the plurality of existing caller profiles exceeds the association threshold, the electronic processor 210 (at block 316) saves the preliminary caller profile to the database as a new caller profile. In some instances, the electronic processor 210 randomly generates a unique alphanumeric identifier for the new caller described by the profile. In some aspects, to ensure no personally identifiable information is included in the unique alphanumeric identifier, the electronic processor 210 actively scrubs any such information that by chance matches some or all of the randomly-generated unique alphanumeric identifier.

In some instances, the electronic processor 210 continually processes call content to generate new or updated call characteristics and update the preliminary caller profile as the service call progresses. In instances where no matching profile is found initially, a matching profile or profiles may be found as the preliminary caller profile acquires more or different data. In some aspects, the electronic processor 210 may update associations scores and/or confidence scores for matching profiles as the as the preliminary caller profile acquires more or different data.

Figure 5:
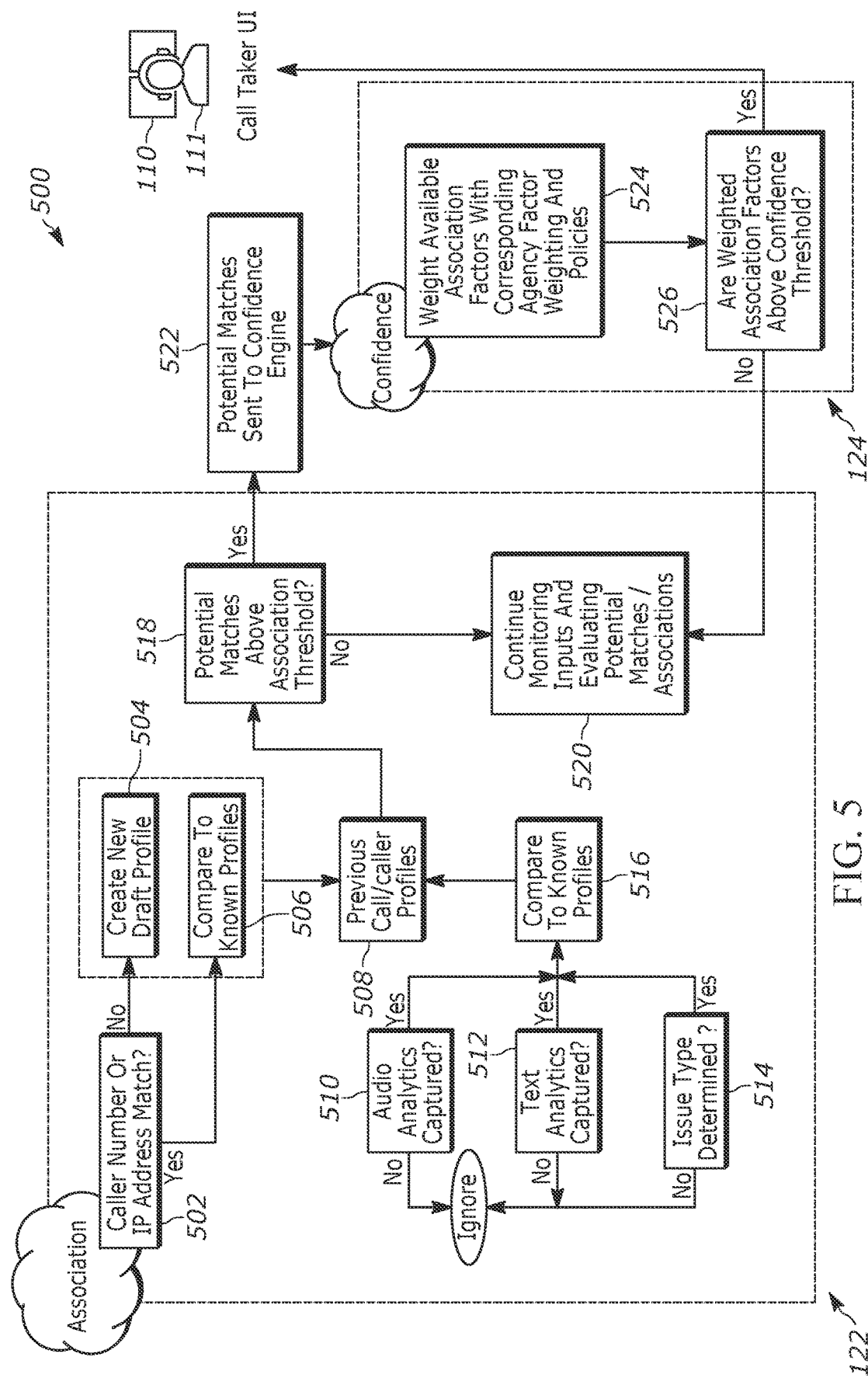
FIG. 5 is a diagram illustrating an example method for automated caller profile generation and identification.

FIG. 5 illustrates another example method 500 for automated caller profile generation and identification. Although the method 500 is described in conjunction with the system 100 as described herein, the method 500 may be used with other systems and devices. For example, the method 500 may be used to identify 911 callers where other identification information has not been provided with the call or is otherwise unavailable. In addition, the method 500 may be modified or performed differently than the specific example provided.

As illustrated in FIG. 5, the association engine 122 and the confidence engine 124 interact to automatically identify caller profile data for presentation on the call-taking terminal 110. The association engine 122 begins processing a service call at block 502, where it determines whether the originating number for the service call (for example, the telephone number or IP address) match prior originating numbers for previous calls to the service answering point or a public safety answering point. For example, the association engine 122 may send a query to the caller profile database 104 (or another appropriate data source) to determine whether it is likely that the caller has previously called the service answering point or a public safety answering point in the past.

At block 502, where the originating number does not match any prior originating numbers, the association engine 122 (at block 504) creates a new caller profile in the caller profile database 104. In some instances, the association engine 122 may analyze the call content to determine call characteristics (as described herein) to populate the new draft caller profile. In addition, data entered into the call-taking terminal 110 regarding the call is saved in the new draft caller profile. In some instances, the electronic processor 210 randomly generates a unique alphanumeric identifier for the new caller described by the draft profile. In some aspects, to ensure no personally identifiable information is included in the unique alphanumeric identifier, the electronic processor 210 actively scrubs any such information that by chance matches some or all of the randomly-generated unique alphanumeric identifier At block 502, where the originating number does match a prior originating number, or it is otherwise determined that it is likely that the caller has previously called the service answering point or a public safety answering point in the past, the association engine 122 (at block 506) creates a preliminary caller profile (as described above with respect to the method 300) and (at block 508) compares it to previous (existing) caller profiles, as described above with respect to the method 300.

As the service call progresses, the association engine 122 performs audio analytics and text analytics, as applicable and as described above with respect to the method 300. Where audio analytics are available (at block 510) and text analytics are available (at block 512), the results of those analytics are added to the preliminary caller profile (or the new draft caller profile, as applicable) compared to the existing caller profiles (at block 516), as described above with respect to the method 300. Similarly, where the association engine 122 determines an issue type for the service call (at block 514), the issue type is compared to the existing caller profiles (at block 516), as described above with respect to the method 300.

As the comparisons are made, the association generates association scores for the matching existing profiles, which indicate how closely the preliminary caller profile or the new draft caller profile match the existing caller profiles (as described above with respect to the method 300). At block 518, the association engine 122 determines whether any of the potentially matching existing profiles have an association score above the association threshold. Where none exceed the threshold, the association engine 122 continues analyzing call content and monitoring inputs (for example, from the call-taking terminal 110), updating the preliminary caller profile or the new draft caller profile.

Where the association score exceeds the association threshold (at block 518), the association engine 122 sends the matching profiles to the confidence engine 124 for confidence scoring. At block 524, the confidence engine 124 generates a confidence score for matching profiles by weighting the association factors, as described above with respect to the method 300. For example, the confidence engine 124 may use weights or polices provided by government agencies to specify the weights used to generate confidence scores.

At block 526, the confidence engine 124 determines whether the confidence score exceeds a confidence threshold, as described above with respect to the method 300. Where the confidence score exceeds the confidence threshold, profile data from the matching profile is displayed for the call taker 111 on the call-taking terminal 110, in particular, within a user interface presented on the call-taking terminal 110 (for example, as described above with respect to the method 300 and FIG. 4).

In some instances, where the confidence score does not exceed the confidence threshold (at block 526), the confidence engine 124 notifies the association engine 122 to continue monitoring and analyzing the call content (at block 520). In some instances, when a potentially matching profile fails to exceed the confidence threshold, the association engine 122 will assign a higher association threshold to the potentially matching profile so that a new confidence score will be generated only when the potentially matching profile achieves a higher level of association. In other instances the association engine 122 will send the potentially matching profile to the confidence engine 124 for re-evaluation after an amount of new data has been added to the profile. New data may include the addition of or a change in one or more new audio analytics or text analytics sub factors or an issue type. In some instances, a combination of approaches may be used (for example, the association engine 122 may require one additional factor and a 10% increase in the association score before sending the potentially matching profile to the confidence engine 124 for re-evaluation).

In some instances, where a new draft caller profile exceeds the association threshold, the new draft caller profile is merged with the matching existing caller profile. In this way, multiple originating numbers (as well as other data collected for the new draft profile) are available to identify the caller in the future. In some instances, a higher association threshold value must be exceeded before profile merging is performed.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for automated caller profile generation and identification, the system comprising:
   a database storing caller profile data for a plurality of callers; and
   an electronic processor communicatively coupled to the database and configured to:
   receive, from a service answering point, a service call from a caller;
   determine, based on a content of the service call, a call characteristic;
   generate a preliminary caller profile based on the call characteristic;
   compare the preliminary caller profile to each of a plurality of existing caller profiles retrieved from the database to generate, for each of the plurality of existing caller profiles, an association score based on the comparison;
   when the association score for one of the plurality of existing caller profiles exceeds an association threshold, present data about the caller from the existing caller profile including information about how to better help the caller including topics to focus on or avoid based on caller history on a call-taking terminal of the service answering point assigned to the service call; and
   when none of the association scores for the plurality of existing caller profiles exceeds the association threshold, save the preliminary caller profile to the database as a new caller profile with a randomly generated unique alphanumeric identifier that is actively scrubbed of personally identifiable information.

2. The system of claim 1, wherein the electronic processor is configured to, for each of the plurality of existing caller profiles where the association score exceeds the association threshold:
   generate a confidence score for the existing caller profile based on the call characteristic and a confidence factor associated with the call characteristic; and
   present data about the caller from the existing caller profile on the call-taking terminal only when the confidence score for the existing caller profile exceeds a confidence threshold.

3. The system of claim 2, wherein the electronic processor is further configured to extract the data about the caller from the existing caller profile based on the confidence score for the existing caller profile.

4. The system of claim 1, wherein the electronic processor is further configured to:
   determine an originating number for the service call; and
   determine that it is likely that the caller has previously called the service answering point or a public safety answering point when the originating number matches a prior originating number known to the service answering point or a public safety answering point; and
   responsive to determining that it is likely that the caller has previously called the service answering point or the public safety answering point, retrieve, from the database, the plurality of existing caller profiles based on the originating number.

5. The system of claim 1, wherein the content of the service call includes an audio stream and the electronic processor is further configured to determine the call characteristic by performing audio analytics on the audio stream.

6. The system of claim 1, wherein the content of the service call includes a voice sample and the electronic processor is further configured to determine the call characteristic by performing voice recognition on the voice sample.

7. The system of claim 1, wherein the content of the service call includes text and the electronic processor is further configured to determine the call characteristic by performing text analytics on the text.

8. The system of claim 1, wherein the content of the service call includes text transcribed from an audio stream of the service call and the electronic processor is further configured to determine the call characteristic by performing text analytics on the text.

9. The system of claim 2, wherein the electronic processor is further configured to:
   generate, on the call-taking terminal, a graphical user interface including a call indicator associated with the service call, the call indicator including a call identifier, a profile match indicator, and a confidence score indicator;
   receive a user input selecting either the profile match indicator or the confidence score indicator; and
   present the data about the caller from the existing caller profile responsive to receiving the user input.

10. The system of claim 1, wherein:
    profile data for a plurality of callers stored in the database includes a unique caller identifier for each of the plurality of callers containing unique information about individual callers and may include personal identifiable information for each of the plurality of callers, wherein the unique caller identifier is not related to or derived from any personal identifiable information for the caller; and
    the database is accessible to both the service answering point and a public safety answering point and is configured to:
    responsive to receiving a request from the service answering point to provide the plurality of existing caller profiles, provide the plurality of existing caller profiles, including their respective unique caller identifiers and not including any personal identifiable information for the callers associated with the plurality of existing caller profiles; and
    responsive to receiving a request from the public safety answering point to provide an existing caller profile, provide the existing caller profile, including any personal identifiable information for the caller existing caller profile.

11. A method for automated caller profile generation and identification, the method comprising:
    receiving, from a service answering point, a service call from a caller;
    determining, with an electronic processor, based on a content of the service call, a call characteristic;
    generating a preliminary caller profile based on the call characteristic;
    comparing the preliminary caller profile to each of a plurality of existing caller profiles retrieved from a database storing caller profile data for a plurality of callers to generate, for each of the plurality of existing caller profiles, an association score based on the comparison; and
    presenting data about the caller from the existing caller profile including information about how to better help the caller including topics to focus on or avoid based on caller history on a call-taking terminal of the service answering point assigned to the service call when the association score for one of the plurality of existing caller profiles exceeds an association threshold; and when none of the association scores for the plurality of existing caller profiles exceeds the association threshold, saving the preliminary caller profile to the database as a new caller profile with a randomly generated unique alphanumeric identifier that is actively scrubbed of personally identifiable information.

12. The method of claim 11, further comprising:

for each of the plurality of existing caller profiles where the association score exceeds the association threshold:

generating a confidence score for the existing caller profile based on the call characteristic and a confidence factor associated with the call characteristic; and presenting data about the caller from the existing caller profile on the call-taking terminal only when the confidence score for the existing caller profile exceeds a confidence threshold.

13. The method of claim 12, further comprising:

extracting the data about the caller from the existing caller profile based on the confidence score for the existing caller profile.

14. The method of claim 11, further comprising:

determining, with the electronic processor, an originating number for the service call; and determining, with the electronic processor, that it is likely that the caller has previously called the service answering point or a public safety answering point when the originating number matches a prior originating number known to the service answering point or a public safety answering point; and responsive to determining that it is likely that the caller has previously called the service answering point or the public safety answering point, retrieving, with the electronic processor, from the database, the plurality of existing caller profiles based on the originating number.

15. The method of claim 11, further comprising:

determining the call characteristic by performing audio analytics on an audio stream included in the content of the service call.

16. The method of claim 11, further comprising:

determining the call characteristic by performing voice recognition on a voice sample included in the content of the service call.

17. The method of claim 11, further comprising:

determining the call characteristic by performing text analytics on text included in the content of the service call.

18. The method of claim 11, further comprising:

determining the call characteristic by performing text analytics on text transcribed from an audio stream included in the content of the service call.

19. The method of claim 12, further comprising:

generating, on the call-taking terminal, a graphical user interface including a call indicator associated with the service call, the call indicator including a call identifier, a profile match indicator, and a confidence score indicator;

receiving a user input selecting either the profile match indicator or the confidence score indicator; and presenting the data about the caller from the existing caller profile responsive to receiving the user input.

20. The method of claim 11, wherein:

profile data for a plurality of callers stored in the database includes a unique caller identifier for each of the plurality of callers containing unique information about individual callers and may include personal identifiable information for each of the plurality of callers, wherein the unique caller identifier is not derived from or related to any personal identifiable information for the caller; and the database is accessible to both the service answering point and a public safety answering point; and the method further comprises, responsive to receiving a request from the service answering point to provide the plurality of existing caller profiles, providing to the service answering point the plurality of existing caller profiles, including their respective unique caller identifiers and not including any personal identifiable information for the callers associated with the plurality of existing caller profiles.

* * * * *